United States Patent
Yang et al.

(10) Patent No.: US 8,442,535 B2
(45) Date of Patent: May 14, 2013

(54) METHOD, SYSTEM AND DEVICE FOR MAINTAINING USER SERVICE CONTINUITY

(75) Inventors: Yanmei Yang, Shenzhen (CN); Xiaojun Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/251,653

(22) Filed: Oct. 3, 2011

(65) Prior Publication Data

US 2012/0058766 A1    Mar. 8, 2012

Related U.S. Application Data

(63) Continuation of application No. 12/914,121, filed on Oct. 28, 2010, which is a continuation of application No. PCT/CN2009/070113, filed on Jan. 12, 2009.

(30) Foreign Application Priority Data

Apr. 28, 2008  (CN) .......................... 2008 1 0066885
Aug. 1, 2008   (CN) .......................... 2008 1 0145545

(51) Int. Cl.
    *H04L 9/00*    (2006.01)
(52) U.S. Cl.
    USPC .......................................... 455/436; 380/45
(58) Field of Classification Search ............... 455/432.1, 455/436
    See application file for complete search history.

(56) References Cited

U.S. PATENT DOCUMENTS

| | | | | |
|---|---|---|---|---|
| 6,928,284 | B2* | 8/2005 | Palat et al. ..................... | 455/436 |
| 7,257,403 | B2* | 8/2007 | Nikkelen ...................... | 455/436 |
| 2004/0157600 | A1* | 8/2004 | Stumpert et al. ........... | 455/432.1 |
| 2006/0194580 | A1* | 8/2006 | Gruber .......................... | 455/436 |
| 2006/0246902 | A1* | 11/2006 | Back et al. .................... | 455/436 |
| 2007/0021120 | A1* | 1/2007 | Flore et al. .................... | 455/436 |
| 2008/0095362 | A1* | 4/2008 | Blom et al. .................... | 380/45 |
| 2008/0318574 | A1* | 12/2008 | Bi ................................. | 455/436 |

FOREIGN PATENT DOCUMENTS

| | | | |
|---|---|---|---|
| CN | 1705401 | | 12/2005 |
| CN | 1705401 A | * | 12/2005 |
| CN | 1784073 | | 6/2006 |
| CN | 101001460 | | 7/2007 |
| CN | 101014186 | | 8/2007 |
| EP | 1090519 | | 3/2003 |
| WO | 2007/0141607 | | 12/2007 |
| WO | 2007141607 | | 12/2007 |
| WO | 2009/0132524 | | 11/2009 |

OTHER PUBLICATIONS

See machine translation and partial translation for CN1705401A.*

(Continued)

*Primary Examiner* — Kent Chang
*Assistant Examiner* — Ngan Pham Lu

(57) ABSTRACT

A method, a system and a device for maintaining user service continuity are provided in an embodiment of the present invention. The method includes prohibiting a UE from accessing a forbidden network before handover is complete when the UE needs to perform network handover if the UE adopts a SIM access technology, thus avoiding service interruption of a SIM user due to access to an incorrect network. A system and a device for maintaining user service continuity are provided in an embodiment of the present invention.

17 Claims, 8 Drawing Sheets

OTHER PUBLICATIONS

See machine translation and partial translation for CN1705401A, Xing P, A switching method between system, CN1705401A—Dec. 7, 2005.*
*Inter eNodeB handover with CN node relocation*, 3GPP TSG SA WG2 Architecture—2#56c Rel-8 Ad-hoc, S2-071189, Warsaw, Poland, Mar. 26-30, 2007, pp. 1-9.
*3rd Generation Partnership Project; Technical Specification Group Services and System Aspects; 3GPP System Architecture Evolution; Security Architecture*; (Release 8), 3GPP TS 33.abc V1.0.0, Feb. 2008, pp. 1-34.
*3rd Generation Partnership Project; Technical Specification Group Services and System Aspects; General Packet Radio Service (GPRS) enhancements for Evolved Universal Terrestrial Radio Access Network (E-UTRAN) access* (Release 8), 3GPP TS 23.401 V8.1.0, Mar. 2008, pp. 26-117.
*3rd Generation Partnership Project; Technical Specification Group Core Network and Terminals; General Packet Radio Service (GPRS); GPRS Tunnelling Protocol (GTP) across the Gn and Gp interface* (Release 7), 3GPP TS 29.060 V7.9.0, Mar. 2008, pp. 1-144.
*3rd Generation Partnership Project; Technical Specification Group Services and System Aspects; 3GPP System Architecture Evolution; Security Architecture*; (Release 8), 3GPP TS 33.401 V1.1.0, Apr. 2008, pp. 1-45.
*pCR: On the use of a GSM Security context*, 3GPP TSG SA WG3 Security—SA3#51, S3-080407, Vancouver, Canada, Apr. 14-18, 2008, pp. 1-10.
Written Opinion of the International Searching Authority, mailed Apr. 9, 2009, in International Application No. PCT/CN2009/070113 (4 pp.).
Office Action, mailed Jun. 10, 2010, in corresponding Chinese Application No. 200810145545.6 (7 pp.).

Extended European Search Report, mailed Sep. 20, 2011, in European Application No. 09737635.4 (11 pp.).
U.S. Appl. No. 12/914,121, filed Oct. 28, 2010, Yang et al., Huawei Technologies Co., Ltd. of Shenzhen, P.R. China.
International Search Report, mailed Apr. 9, 2009, in corresponding International Application No. PCT/CN2009/070113 (4 pp.).
*3rd Generation Partnership Project; Technical Specification Group Radio Access Network; UTRAN Iu interface RANAP signaling* (Release 7), 3GPP TS 25.413 V7.8.0, Dec. 2007, pp. 1-359.
*3rd Generation Partnership Project; Technical Specification Group Services and System Aspects; General Packet Radio Service (GPRS) enhancements for Evolved Universal Terrestrial Radio Access Network (E-UTRAN) access* (Release 8), 3GPP TS 23.401 V8.1.0, Mar. 2008, pp. 1-171.
*3rd Generation Partnership Project; Technical Specification Group Core Network and Terminals; General Packet Radio Service (GPRS); GPRS Tunneling Protocol (GTP) across the Gn and Gp interface* (Release 7), 3GPP TS 29.060 V7.9.0, Mar. 2008, pp. 1-144.
Office Action, mailed Jun. 10, 2010, in corresponding Chinese Application No. 200810145545.6.
Written Opinion of the International Searching Authority, mailed Apr. 9, 2009, in International Application No. PCT/CN2009/070113 (4 pp.).
Office Action, dated Jan. 23, 2012, in corresponding U.S. Appl. No. 12/914,121 (16 pp.).
First office action issued in corresponding European patent application No. 09737635.4, dated Jun. 5, 2012, 10 pages total.
Office action issued in corresponding U.S. Appl. No. 12/914,121, dated Sep. 14, 2012, 20 pages total.

* cited by examiner

METHOD, SYSTEM AND DEVICE FOR MAINTAINING USER SERVICE CONTINUITY

CROSS-REFERENCE TO RELATED APPLICATIONS

This application is a continuation of U.S. patent application Ser. No. 12/914,121, filed on Oct. 28, 2010, which is a continuation of International Application No. PCT/CN2009/070113, filed on Jan. 12, 2009. The International Application claims priorities to Chinese Patent Application No. 200810066885.X, filed on Apr. 28, 2008 and Chinese Patent Application No. 200810145545.6, filed on Aug. 1, 2008. The afore-mentioned patent applications are hereby incorporated by reference in their entireties.

FIELD OF THE INVENTION

The present invention relates to the field of communications technologies, and in particular, to a technology for maintaining user service continuity.

BACKGROUND OF THE INVENTION

With the constant development of communications technologies, a user can access a core network of an operator through any of the following access methods: Global System for Mobile communications/Enhanced Data rates for GSM Evolution Radio Access Network (GERAN), Universal Mobile Telecommunication System Terrestrial Radio Access Network (UTRAN), and evolved UTRAN (eUTRAN).

When a user moves between networks, to maintain continuity of user services, seamless handover between access technologies such as GERAN, UTRAN, and eUTRAN is required.

In the prior art, users who adopt a Subscriber Identity Module (SIM) or run SIM applications on a Universal Integrated Circuit Card (UICC) are called SIM users. When a SIM user communicates in a UTRAN or GERAN network and moves to a border between an eUTRAN and the UTRAN or GERAN, if the signal strength of the eUTRAN is stronger than that of other access networks, or if a service requires, the source network may select the eUTRAN as the target network for network handover and switch the user to the eUTRAN temporarily through a normal handover process. In this case, the SIM user can temporarily use the resources of the core network and then execute Authentication and Key Agreement (AKA). The SIM, however, does not support AKA. Therefore, if the SIM user is identified during this process, the connection of the SIM user to the eUTRAN is terminated.

During the implementation of the present invention, the inventor discovers the following disadvantages in the prior art: The existing technology implements the function of forbidding a SIM user to access an eUTRAN. After the SIM user temporarily switches to the eUTRAN, the eUTRAN rejects the access of the SIM user according to the AKA result. At this time, the SIM user is disconnected from the originally available network, which leads to service interruption.

SUMMARY OF THE INVENTION

A method, a system and a device for maintaining user service continuity are provided in an embodiment of the present invention, to avoid service interruption of a SIM user due to access to a forbidden network and maintain user service continuity.

A method for maintaining user service continuity is provided in an embodiment of the present invention. The method includes:

when a User Equipment (UE) needs to perform network handover, prohibiting the UE from accessing a forbidden network before the network handover is complete if the UE adopts a Subscriber Identity Module (SIM) technology for access; and selecting an accessible target network for the UE.

A system for maintaining user service continuity is provided in an embodiment of the present invention. The system includes:

a judging unit, configured to judge whether a UE is a SIM user when the UE needs to perform network handover; and a handling unit, configured to prohibit the UE from accessing a forbidden network before the network handover is complete when the judging unit determines that the UE is a SIM user; and select an accessible target network for the UE.

A device for maintaining user service continuity is provided in an embodiment of the present invention. The device includes:

a judging unit, configured to judge whether a UE is a SIM user when the UE needs to perform network handover; and a handling unit, configured to prohibit the UE from accessing a forbidden network before the network handover is complete when the judging unit determines that the UE is a SIM user.

A method for maintaining user service continuity is provided in another embodiment of the present invention. The method includes:

prohibiting a UE in the Idle state from accessing a forbidden network during location update of the UE if the UE adopts a SIM access technology when the UE moves between networks.

A Mobile Management Entity (MME) is provided in an embodiment of the present invention. The MME includes:

an obtaining unit, configured to obtain information about a user type of a UE or information about a forbidden network type, wherein the information about the forbidden network type indicates the information about a type of network that the UE cannot access; and a handling unit, configured to implement, when the UE in the Idle state moves between networks, handling, according to the information about the user type of the UE or information about the forbidden network type obtained by the obtaining unit, wherein the handling includes prohibiting the UE from accessing a forbidden network during location update of the UE when the UE is a SIM user.

Another method for maintaining user service continuity is provided in an embodiment of the present invention. The method includes:

a UE shields a forbidden network type according to a user identity module type.

Through comparison, it can be seen that any one of the preceding technical solutions has the following advantages or beneficial effects over the prior art:

In an embodiment of the present invention, before a SIM user accesses or temporarily accesses to a forbidden network, such as an eUTRAN, that is, before handover is complete, a judgment is made about a user type or forbidden network type. If the UE is a SIM user, and a target network does not allow access of a SIM user, the UE is prohibited from handing over to the target network, and another target network is selected for handover. In this way, service interruption occurring due to incorrect access of the SIM user to the eUTRAN is avoided, and user service continuity is maintained. In addition, after a UE in the Idle state moves between networks, the UE can be prohibited from accessing a forbidden network during location update, and this avoids service interruption caused by the following scenario: After a SIM user in the Idle state moves to the eUTRAN and transits from the Idle state to the Connected state, the network triggers AKA, but the SIM card does not support AKA. As a result, user service continuity can be maintained to certain extent.

BRIEF DESCRIPTION OF THE DRAWINGS

The present invention is described with reference to some accompanying drawings as follows.

DETAILED DESCRIPTION OF THE EMBODIMENTS

To clarify the purpose, technical solution, and advantages of the embodiments of the present invention, the embodiments of the present invention are described with drawings as follows.

Figure 1:
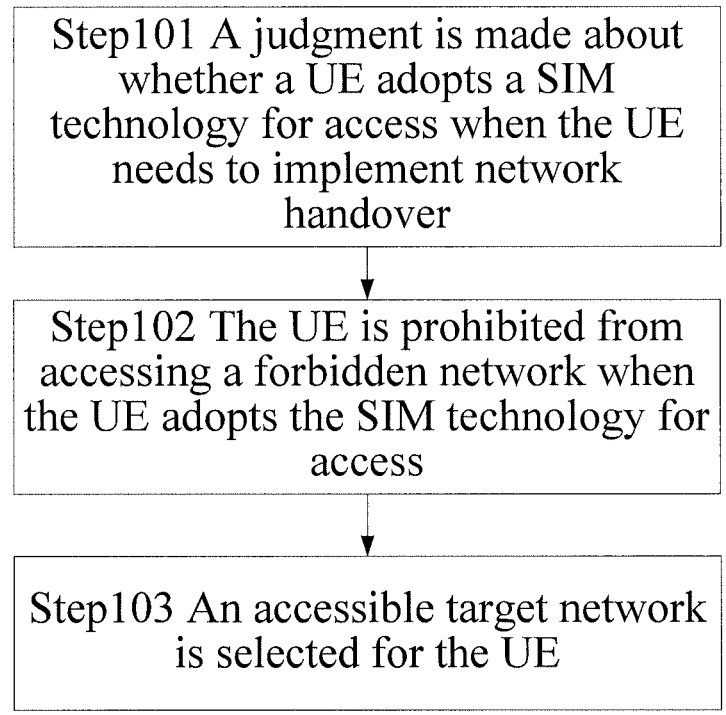
FIG. 1 is a flowchart of a method for maintaining user service continuity according to an embodiment of the present invention.

A method for maintaining user service continuity is provided in an embodiment of the present invention. As shown in FIG. 1, the method includes:

Step 101: A judgment is made about whether a UE adopts a SIM technology for access when the UE needs to perform network handover.

Step 102: The UE is prohibited from accessing a forbidden network before the network handover is complete if the UE adopts the SIM technology for access.

Step 103: An accessible target network is selected for the UE.

According to the preceding solution, embodiments that support the solution are described as follows.

Figure 2:
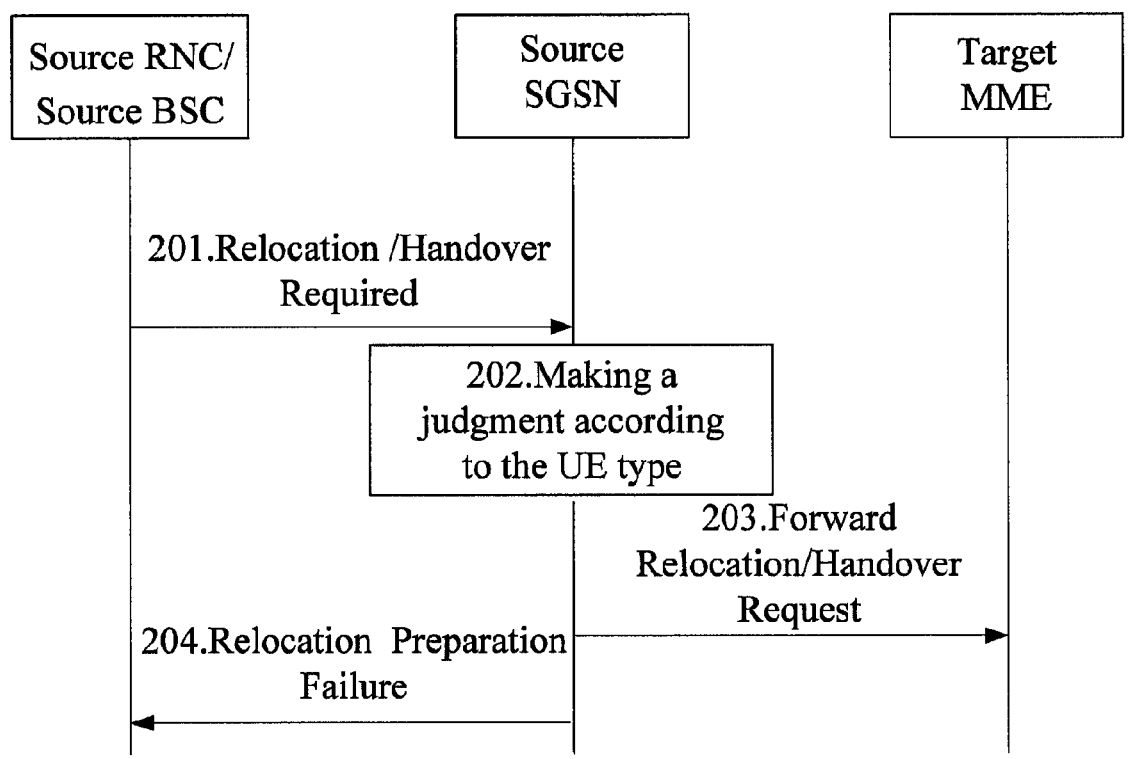
FIG. 2 is a flowchart of a method for maintaining user service continuity according to a first embodiment of the present invention.

An entity at a network side involved in a first embodiment of the present invention includes a source Radio Network Controller (RNC) or source Base Station Controller (BSC), a source Serving GPRS Support Node (SGSN), and a target MME, as shown in FIG. 2.

Step 201: When a UE needs to perform network handover, the source RNC or source BSC sends a Relocation/Handover Required to the source SGSN.

Step 202: The source SGSN judges whether the UE is a SIM user.

The method for obtaining the user type can be as follows: A Home Location Register (HLR) or Home Subscriber Server (HSS) sends a user type indication to an SGSN. The specific sending process can be as follows: After receiving an authentication vector request from the SGSN, the HLR/HSS sends an authentication vector that carries the user type indication to the SGSN; or the HLR/HSS inserts the user type, such as SIM user and USIM user, into user subscription data to the SGSN.

The method for obtaining the user type may also be as follows: The SGSN infers the user type according to the authentication vector type obtained from the HLR/HSS. For example, if the SGSN obtains a quintet from the HLR/HSS, the SGSN determines that the user is a USIM user; if it is a triplet, the SGSN determines that the user is a SIM user.

It should be noted that when the UE performs inter-SGSN handover or cell reselection, a new SGSN needs to obtain the user type information from an original SGSN. The implementation method may be as follows: During handover preparation, the original SGSN sends the user type information to the new SGSN, or the new SGSN obtains the user type information when obtaining the UE context from the original SGSN during location update or route update of the UE.

It should be noted that the original SGSN in an embodiment of the present invention indicates the SGSN that is adopted before inter-SGSN handover or cell reselection of the UE, and the new SGSN indicate the SGSN that the UE belongs to after inter-SGSN handover or cell reselection of the UE.

The method for obtaining the user type may also be as follows: The UE carries the user type information, for example, information about whether the UE is a SIM user, in an initial layer 3 message, such as an attachment request, to enable the SGSN to know the user type of the UE.

If it is judged that the UE which needs to perform network handover is not a SIM user in step 202, the process proceeds to step 203 to send a Relocation/Handover Required message to a target MME, and the subsequent procedure is performed. The non-SIM user, however, may be rejected to access the target network because it is not registered with the target network. If the UE is a SIM user and the target network is a forbidden network for the UE, the process proceeds to step 204 to send a Relocation Preparation Failure message to the source RNC or source BSC. Upon receiving of this message, the source RNC or source BSC can select another access network.

In this embodiment, during handover preparation, when a Relocation/Handover Required message is sent to the source SGSN, the source SGSN judges the user type and determines whether to access the UE to an eUTRAN. In this case, the service interruption occurring due to incorrect access of a SIM user to an eUTRAN is avoided in advance and the service continuity is maintained. At the same time, with the method in this embodiment, the SIM user does not have the chance of using the eUTRAN, and this avoids security risks on the eUTRAN.

Figure 3:
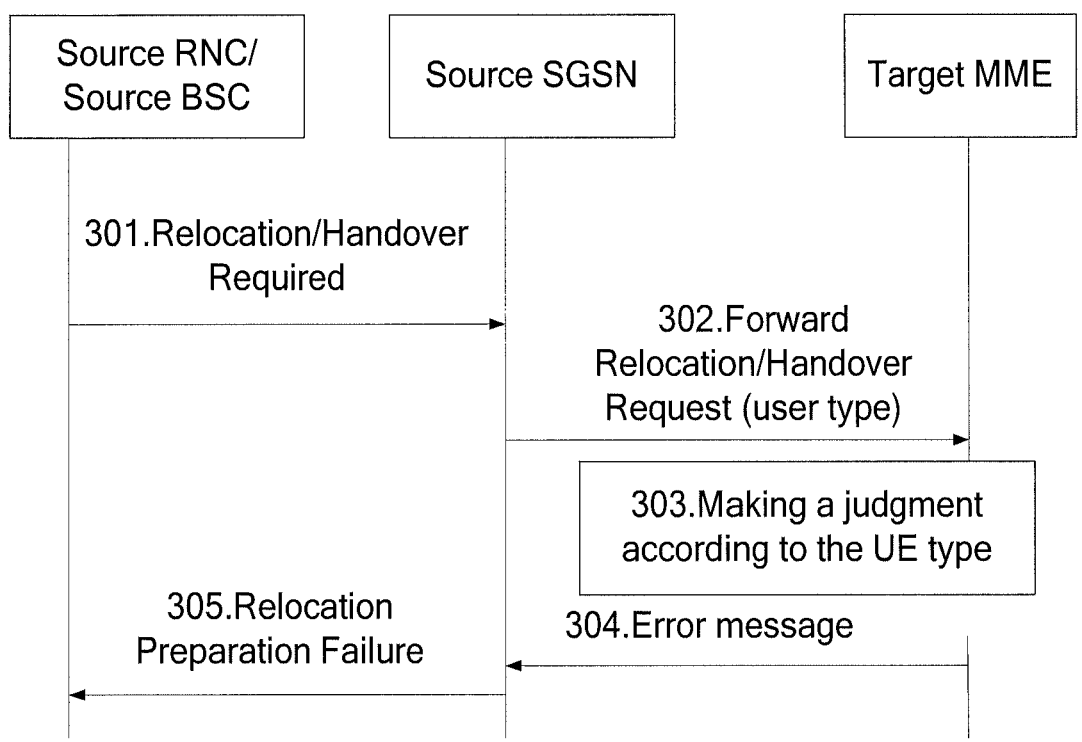
FIG. 3 is a flowchart of a method for maintaining user service continuity according to a second embodiment of the present invention.

The second embodiment is basically the same as the first embodiment. The difference is as follows: In the second embodiment, the target MME judges the UE type, as shown in FIG. 3.

Step 301: The procedure is the same as the procedure in step 201 in the first embodiment.

Step 302: After receiving the Relocation/Handover Required message, the source SGSN sends a Relocation/Handover Required message to the target MME and sends the user type to the target MME. The user type may be carried in the Relocation/Handover Required message, or sent as a separate message.

The method for obtaining the user type by the source SGSN is the same as that in step 202 in the first embodiment.

Step 303: After receiving the Relocation/Handover Required message, the target MME judges, according to the received user type, whether the UE is a SIM user.

If it is judged that the UE which needs to handover to the eUTRAN is a SIM user in step 303, the process proceeds to step 304 to return an error message to the source SGSN. In step 305, the source SGSN returns the handover failure message to the source RNC or source BSC. Then, the source RNC or source BSC selects another access network for the UE.

In this embodiment, the SGSN obtains and forwards the user type. When the Relocation/Handover Required message is sent to the target MME, the target MME determines according to the user type whether to access the UE to the eUTRAN, and this prevents service interruption due to incorrect access to the eUTRAN and maintains the service continuity. At the same time, through the method in this embodiment, the SIM user does not have the chance of using the eUTRAN, and this avoids bringing security risks on the eUTRAN.

Figure 4:
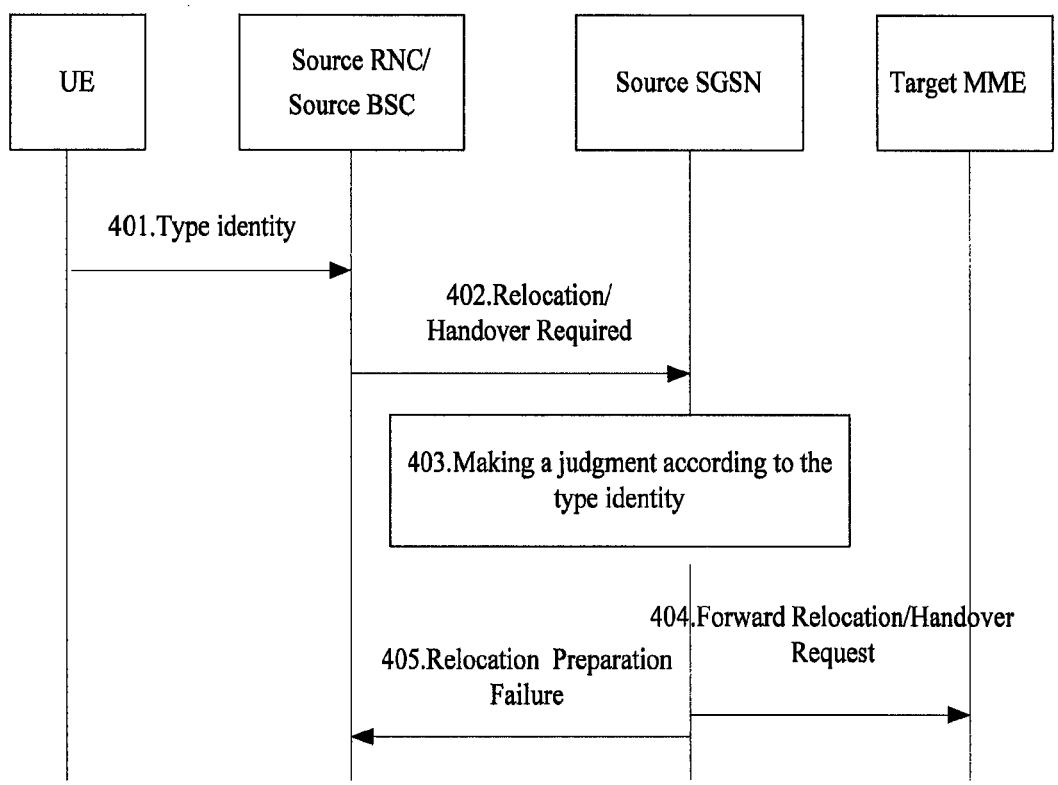
FIG. 4 is a flowchart of a method for maintaining user service continuity according to a third embodiment of the present invention.

The main difference between the third embodiment and the first and second embodiments is as follows: In the third embodiment, the UE sends the user type to the network side. That is, the basis for judging the UE type is different. See FIG. 4.

Step 401: The UE sends a type identity to the source RNC or source BSC.

This type identity may be carried in a Radio Resource Control (RRC) connection request or completion message during RRC connection establishment, or carried in other RRC messages, such as a security mode command completion message.

It should be noted that the type identity in the embodiment of the present invention is a parameter used to uniquely identify a UE type. The UE type may be SIM or USIM. This parameter may be a field that identifies the user, or an identity recognized by the network side and UE. The type identity is a name adopted merely to facilitate description. This name cannot confine the applicable scope of the embodiment of the present invention. That is, in certain systems, the expression of type identity may not be adopted. However, it cannot be deemed that the technical scheme in the embodiment of the present invention does not apply to such systems.

Step 402: When the UE needs to perform handover between GERAN and UTRAN, the source RNC or source BSC sends the Relocation/Handover Required message that carries the user type identity.

Step 403: After receiving the Relocation/Handover Required message and type identity, the source SGSN determines whether switch the UE to the target network according to whether the UE is a SIM user.

If it is judged that the UE which needs to perform network handover is not a SIM user in step 403, the process proceeds to step 404 to send a Relocation/Handover Required message to a target MME, and subsequent procedure proceeds. The non-SIM user, however, may be rejected to access the target network because it is not registered with the target network. If the UE is a SIM user, and the target network is a forbidden network for the UE, the process proceeds to step 405 to send a Relocation Preparation Failure message to the source RNC or source BSC. Upon receiving of this message, the source RNC or source BSC can select another access network.

It should be noted that an alternative scheme of this embodiment may be as follows: The source SGSN does not judge the user type, but forwards the Relocation/Handover Required message and type identity to the target MME, which judges the user type; or after receiving the type identity of the UE, the source RNC or source BSC rules out the forbidden networks during handover decision phase. For example, if the UE is a SIM user, the source RNC or source BSC does not select a network that forbids SIM access, such as eUTRAN.

In this embodiment, the UE reports the type identity to the network side, facilitating the entity at the network side to directly read the identity and determine the user type indicated by this identity. As a result, service interruption due to incorrect access of a SIM user to an eUTRAN can be prevented during handover decision or handover preparation, and this maintains service continuity of the UE. In addition, as stated in the benefits of the previous embodiments, the security risks on the eUTRAN can be avoided.

Figure 5:
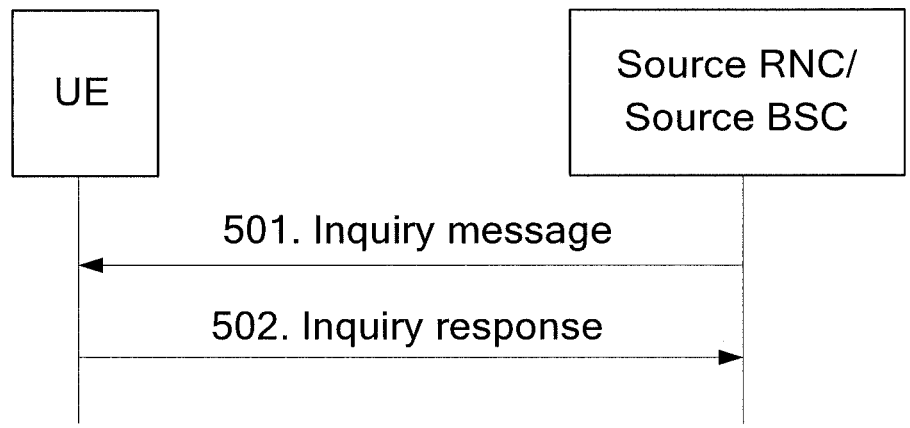
FIG. 5 is a flowchart of a method for maintaining user service continuity according to a fourth embodiment of the present invention.

The fourth embodiment of the present invention is basically the same as the previous embodiments. The main difference is that: The network side inquires the UE, and subsequent actions depend on the response of the UE. See FIG. 5.

Step 501: When the UE needs to perform network handover, the source RNC or source BSC sends an inquiry message to the UE. This message may carry the type identity of the target network.

Step 502: The source RNC or source BSC receives a response from the UE.

The response can be sent by the UE based on the judgment of the UE about whether to access the target network. If the UE is a SIM user, and the target network is an eUTRAN, access rejection information is carried in the response. In this case, the source RNC or source BSC needs to select another target network. If the UE judges that it can access the target network, the response carries the access approval information. In this case, the source RNC or source BSC performs network handover according to the normal handover flow.

The response may also be as follows: The UE does not make the preceding judgment, but directly reports its user type or forbidden network information to the network side.

In this embodiment, the UE may actively choose whether to access the network, or the network side determines, according to the response from the UE, whether to allow the UE to access the eUTRAN, and thus prevents incorrect access of a SIM user to an eUTRAN, and maintains service continuity.

Figure 6:
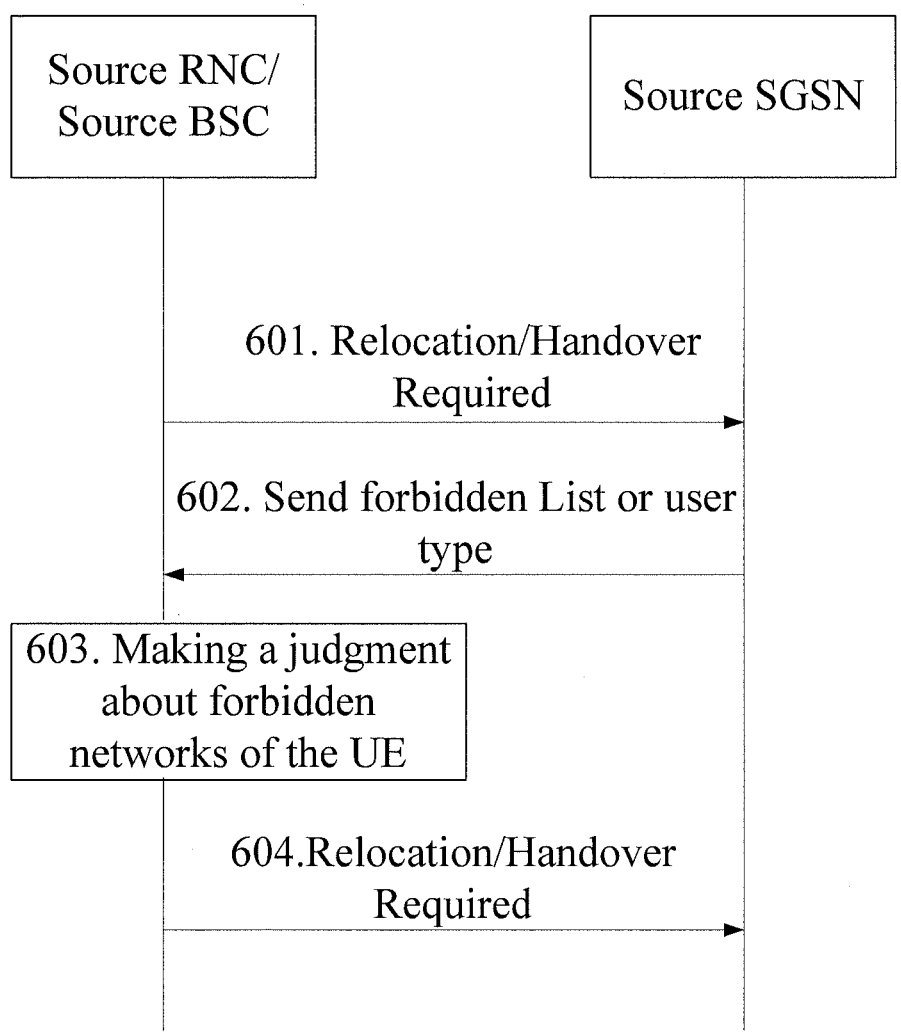
FIG. 6 is a flowchart of a method for maintaining user service continuity according to a fifth embodiment of the present invention.

In the fifth embodiment of the present invention, the source RNC or source BSC obtains a Forbidden List or user type information from the core network, as shown in FIG. 6.

Step 601: When the UE needs to perform network handover, the source RNC or source BSC sends a Relocation/Handover Required message to the source SGSN.

Step 602: The source SGSN sends forbidden network type or the user type to the source RNC or source BSC.

Forbidden network type may include one or more items. The SGSN can send a Forbidden List to the source RNC or source BSC.

The method for obtaining forbidden network types by the SGSN can be including a Forbidden List in subscription information. When the UE registers with the SGSN, the SGSN obtains the Forbidden List in the subscription information from the HLR or HSS, and sends the Forbidden List as secure context during handover or cell reselection. The Forbidden List may also be generated by the SGSN according to the user type.

Step 603: The source RNC or source BSC determines whether the UE can access a network according to the received user type information, or reads the forbidden networks of the UE from the received Forbidden List. In this way, the source RNC or source BSC selects an accessible network for handover.

Step 604: The source RNC or source BSC selects an accessible network for handover, and sends a Relocation/Handover Required message again.

It should be noted that this Forbidden List can be sent by the source SGSN to the source RNC or source BSC before the UE needs to perform network handover. When the UE needs to perform network handover, the Forbidden List can be referred to determine accessible networks for the UE, and then the source RNC or source BSC can send a Relocation/Handover Required message to the source SGSN.

In this embodiment, a Forbidden List is established to prevent the UE from accessing forbidden networks. This list can cover all the networks that the UE cannot access, thus correctly preventing a SIM user from accessing an eUTRAN in time and maintaining service continuity.

The main difference between the sixth embodiment and the fifth embodiment is as follows: The forbidden network types are not judged by the network side, but on the UE to prevent a SIM user form accessing an eUTRAN.

The detailed procedure can be as follows: A Forbidden List is manually set up on the UE. If the UE is a SIM user, eUTRAN is included in the Forbidden List of the UE. In this way, the UE does not need to detect signals of an eUTRAN during each power-on, and does not measure the frequency band of the eUTRAN during each inter-frequency measurement, or notifies the network side in the measurement report that it cannot detect an eUTRAN cell. In this way, the network side does not select an eUTRAN as the target network, thus preventing a SIM user from accessing the eUTRAN.

The preceding setting flow can be realized by the UE. That is, the UE obtains the user type. If the user type indicates a SIM user, networks that forbid SIM access, such as an eUTRAN, are automatically added to the Forbidden List. Or, the UE judges a forbidden network when receiving a measurement command, and implements subsequent processing.

It should be noted that the Forbidden List in this embodiment means a list that is used to store the forbidden networks of the UE. This name is merely adopted to facilitate description. This name cannot confine the applicable scope of the embodiment of the present invention. That is, in certain systems, the expression of Forbidden list is not adopted. However, it cannot be deemed that the technical scheme in the embodiment of the present invention does not apply to such systems.

Figure 7:
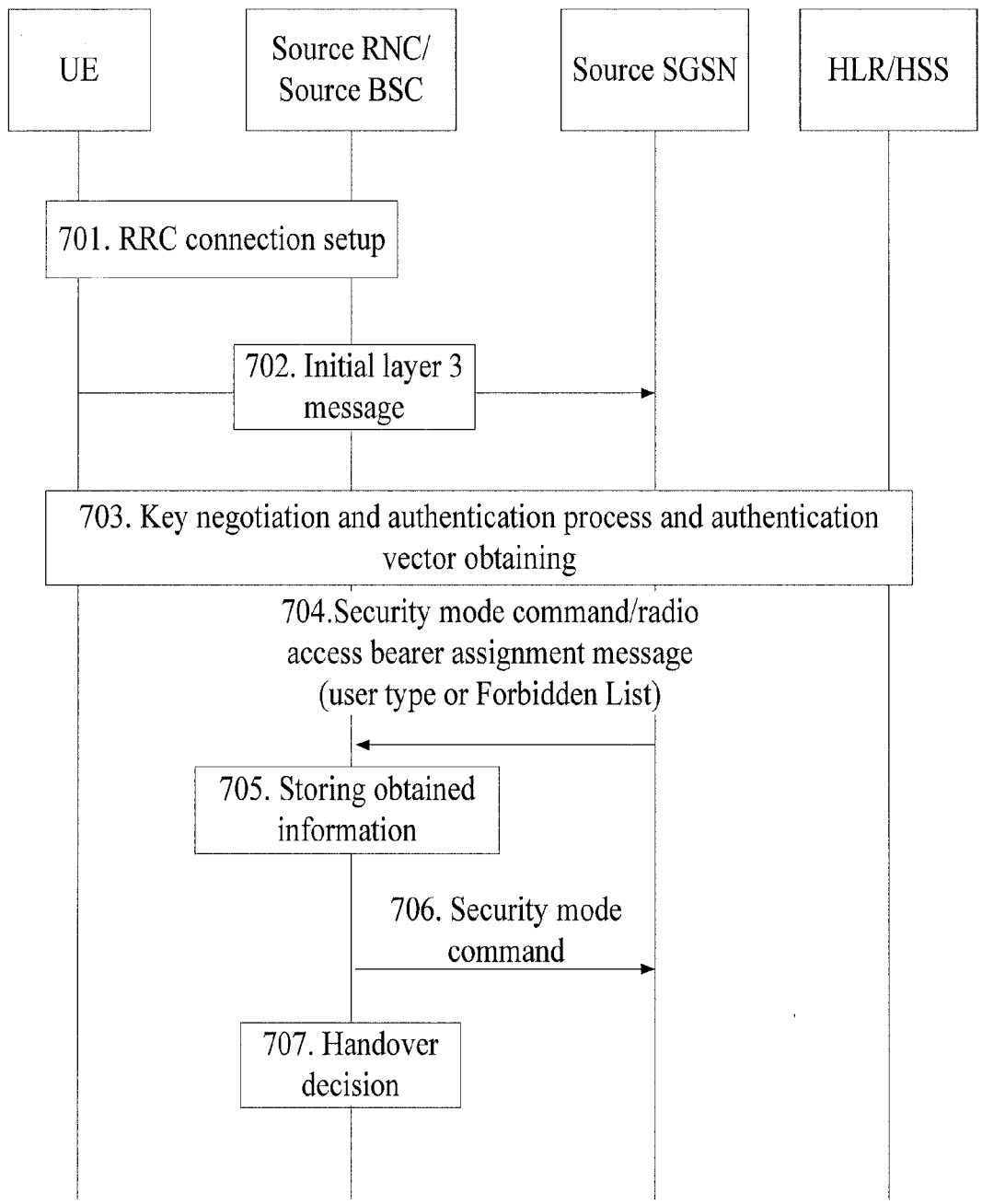
FIG. 7 is a flowchart of a method for maintaining user service continuity according to a seventh embodiment of the present invention.

The main difference between the seventh embodiment and the fifth embodiment is as follows: In this embodiment, before the UE needs to perform network handover, the network side sends the user type or forbidden network types of the UE to the source RNC or source BSC, as shown in FIG. 7.

Step 701: An RRC connection is established between the UE and the source RNC or source BSC.

Step 702: The UE sends an initial layer 3 message, such as attachment request, service request, and location or route update request, to the core network.

Step 703: Alternatively, the source SGSN initiates a key negotiation and authentication flow, and before that, if no unused local authentication vector is available, the authentication vector needs to be obtained from the HLR or HSS.

Step 704: The source SGSN sends forbidden network type or the user type to the source RNC or source BSC.

The source SGSN can carry the forbidden network type or user type in a Radio Access Network Application Part (RANAP) security mode command message, or other interface messages, such as a radio access bearer assignment message. It should be noted that this embodiment does not confine the interface messages. Those skilled in the art can implement the present invention by using other messages, such as a COMMON ID message. For the sending mode, see the relevant description in the fifth embodiment of the present invention.

It should be noted that, if a radio access bearer assignment message is used to carry the forbidden network type or user type, an information element (IE) in the message, such as the Service Handover IE, can be used to inform the source RNC or source BSC whether the UE can access an eUTRAN. For example, the values of the IE include: Handover to eUTRAN should be performed, Handover to eUTRAN should not be performed, and Handover to eUTRAN shall not be performed.

During handover, if the RNC or BSC that governs the UE is changed, the source SGSGN adds the Service Handover IE to the relocation request that is sent to the target RNC or BSC to inform the target RNC whether the UE can access an eUTRAN.

It should be noted that the method for obtaining the user type information about whether the UE is a SIM user by the SGSN includes: sending, by the HLR or HSS, an authentication vector or user subscription data to the SGSN, and obtaining, by the SGSN, the user type information carried in the authentication vector or user subscription data; or, inferring, by the SGSN, the user type information of the UE according to the authentication vector type obtained from the HLR or HSS; or, obtaining, by the RNC or BSC, the user type information carried in an RRC message sent by the UE to the network side, and sending, by the RNC or BSC, the user type information to the SGSN; or, obtaining, by the new SGSN, the user type information of the UE from the original SGSN during inter-SGSN handover or cell reselection; or, sending, by the UE, an initial layer 3 message that carries the user type information to the SGSN.

Further, it should be noted that the method for obtaining the information about forbidden network type by the SGSN includes: inferring the forbidden network type according to the user type information; or, obtaining, by the new SGSN, the information about forbidden network type from the original SGSN during inter-SGSN handover or cell reselection; or, obtaining the information about forbidden network type from the user subscription data.

Step 705: The source RNC or source BSC saves the obtained forbidden network type or the user type.

It should be noted that, before handover to an eUTRAN, if handover inside a UTRAN or a GERAN, or between UTRAN and GERAN occurs, alternatively, the source RNC or source BSC before handover (original RNC or BSC for short) needs to transfer the obtained forbidden network type or user type to the source RNC or source BSC after handover (new RNC or BSC for short).

Step 706: The source RNC or source BSC sends the response corresponding to step 704 to the core network.

Step 707: When the UE needs to perform handover, the source RNC or source BSC judges accessible networks of the UE according to the received user type information or forbidden network type, or obtains the forbidden networks of the UE from the received Forbidden List. In this way, the source RNC or source BSC selects an accessible network for handover.

In this embodiment, the network side selects an accessible network for the UE before the UE needs to perform network handover. Thus, the UE can directly access the accessible network during network handover, maintaining user service continuity and improving network handover efficiency.

Figure 8:
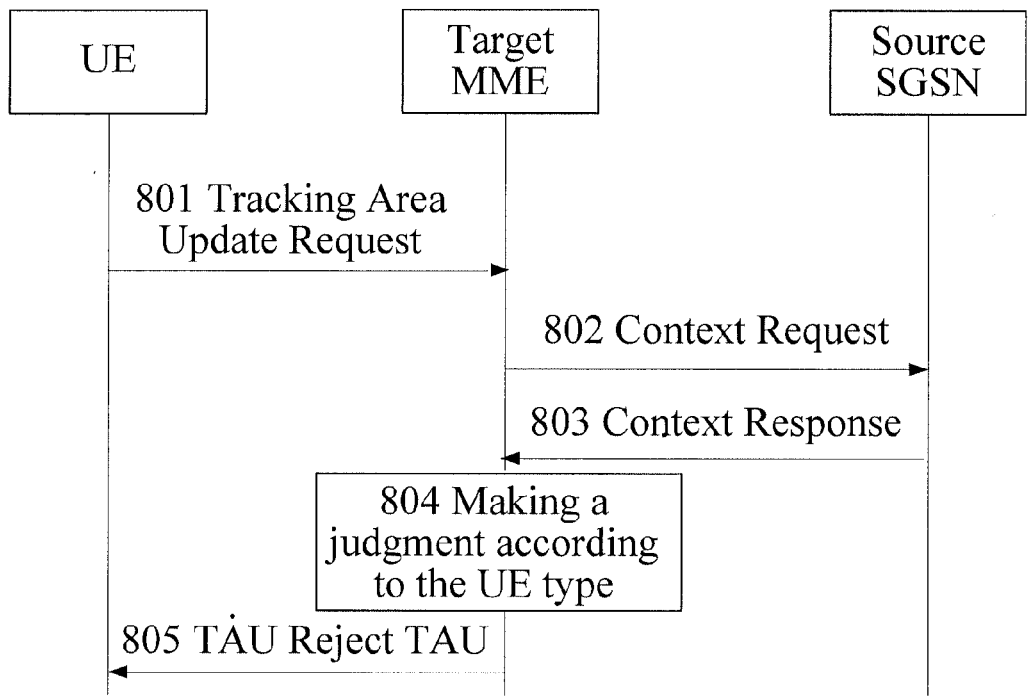
FIG. 8 is a flowchart of a method for maintaining user service continuity according to an eighth embodiment of the present invention.

FIG. 8 is a flowchart of a method for maintaining user service continuity in an eighth embodiment of the present invention. Compare with the third embodiment, the method for maintaining user service continuity in the eighth embodiment differs in that the UE moves to an eUTRAN in the Idle state. The method for maintaining user service continuity in the eighth embodiment includes:

Step 801: The UE sends a Tracking Area Update (TAU) Request to the target MME after moving to an eUTRAN.

Step 802: The target MME sends a context request to the source SGSN to obtain the relevant information of the UE.

Step 803: The source SGSN returns a context response to the target MME. This response can include the user type or forbidden network type of the UE.

Step 804: The target MME makes a judgment according to the user type or forbidden network type of the UE in the context response. If the UE is a SIM user or is forbidden from accessing an eUTRAN, step 805 is executed.

Step 805: The target MME sends a TAU rejection message to the UE to reject the SIM user from accessing the eUTRAN.

In this embodiment, alternatively, the UE can report the user type or forbidden network type in the TAU message in step 801 to the target MME so that the target MME can decide whether to send the TAU rejection message in step 804 according to the user type or forbidden network type. For example, if the UE is a SIM user or the forbidden network type include eUTRAN, the target MME sends the TAU rejection message to the UE to reject the SIM user from accessing the eUTRAN.

Further, in this embodiment, after receiving the TAU rejection message, the UE can select another accessible network, thus avoiding service interruption caused by the following scenario: After a SIM user in the Idle state moves to the eUTRAN and transits from the Idle state to the Connected state, the network triggers AKA, but the SIM card does not support AKA. As a result, user service continuity can be maintained to certain extent.

In this embodiment, the network side selects an accessible network during location update so that the UE can use accessible network resources directly after transiting from the Idle state to the Connected state, thus maintaining user service continuity and improving user experience.

Figure 9:
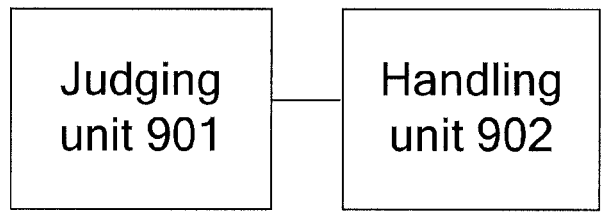
FIG. 9 shows a mobile communication system provided according to a ninth embodiment of the present invention.

A mobile communication system involved in an embodiment of the present invention is described as follows. This system can implement the steps in the methods in the preceding embodiments. It is understandable that the system in this embodiment of the present invention can include other entities that implement communication functions. Those technologies that may be revealed by the existing technology and those standardized technologies in the communication field are not described here. To present the implementation scheme in this embodiment, only the major parts of this system are described. As shown in FIG. 9, this system includes:

a judging unit 901, configured to judge whether a UE is a SIM user when the UE needs to perform network handover; and a handling unit 902, configured to prohibit the UE from accessing a forbidden network before the network handover is complete when the judging unit determines that the UE is a SIM user, and select an accessible target network for the UE.

It should be noted that this judging unit can be placed at the terminal side and configured to make a judgment according to the user type information or forbidden network type from the terminal side, or placed at the network side and configured to make a judgment according to the user type information or forbidden network type from the network side.

A UE is provided in the ninth embodiment of the present invention. The UE includes: a judging unit, configured to judge user identity module type; and a handling unit, configured to shield a forbidden network type according to the user identity module type. The handling unit can further include: a forbidding measuring unit, configured to forbid measuring the forbidden network type.

Figure 10:
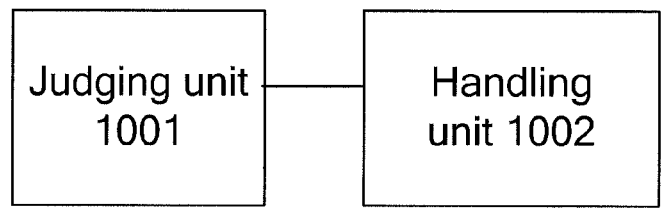
FIG. 10 shows a device according to a tenth embodiment of the present invention.

FIG. 10 shows a device in a tenth embodiment of the present invention. The device includes: a judging unit 1001, configured to judge whether a UE is a SIM user when the UE needs to perform network handover; and a handling unit 1002, configured to forbid the UE from accessing forbidden networks before handover completes when the judging unit judges that the UE is a SIM user. The device can be placed in the SGSN, MME, RNC or BSC.

Figure 11:
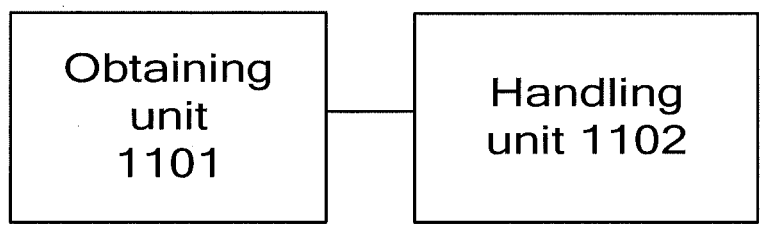
FIG. 11 shows an MME according to an eleventh embodiment of the present invention.

FIG. 11 shows an MME in an eleventh embodiment of the present invention. The MME includes: an obtaining unit 1101, configured to obtain information about user type or information about a forbidden network type of a UE, wherein the information about the forbidden network type indicates the information about a network type that do not allow access of the UE; and a handling unit 1102, configured to implement handling according to the information about user type or information about the forbidden network type of the UE obtained by the obtaining unit 1101 after the UE in the Idle state moves between networks. The handling includes: prohibiting the UE from accessing forbidden networks during location update when the UE is a SIM user.

The method for obtaining the information about user type or information about a forbidden network type of the UE by the obtaining unit 1101 can be as follows: obtaining the information about user type or information about the forbidden network type of the UE from the context response sent by the SGSN, or obtaining the information about user type or information about the forbidden network type of the UE from the location update message sent by the UE.

In the handling unit 1102, the process of prohibiting the UE from accessing forbidden networks during location update can include: rejecting the SIM user from accessing a forbidden network, such as eUTRAN, by sending a TAU rejection message to the UE.

Those killed in the art can complete all or part of the steps in the preceding method by using a program to instruct the hardware. The program can be stored in a storage medium that can be read by a computer. When being executed, the program can include the following steps: prohibiting a UE that needs to perform network handover from accessing a forbidden network if the UE is a SIM user and selecting an accessible target network for the UE. The preceding storage medium can be a read-only storage, a disk, or a compact disk (CD).

In the existing technology, when a SIM user communicates in a UTRAN or GERAN network, and moves to a border between an eUTRAN and the UTRAN or GERAN, if the signal strength of the eUTRAN is stronger than that of other access networks, or in the case of service requirements, the source network may select the eUTRAN as the target network for network handover and switch the user to the eUTRAN temporarily through the normal handover process. In this case, the SIM user can temporarily use the resources of the core network and then execute AKA. The SIM, however, does not support AKA. Therefore, if the SIM user is identified during this process, the connection of the SIM user to the eUTRAN is terminated, causing user service interruption. Through the scheme in this embodiment of the present invention, when the UE needs to perform network handover, the UE is prohibited from accessing forbidden networks, and an accessible network is selected for the UE before handover is complete, thus avoiding service interruption of the SIM user during network handover and maintaining service continuity. In addition, through the method in this embodiment, the SIM user does not have the chance of using the eUTRAN, thus avoiding security risks in the eUTRAN. The solution in the embodiment of the present invention applies to service interruption caused by incorrect access to other networks that forbid access of SIM users in addition to eUTRAN.

The present invention is described through certain preferred embodiments and drawings. It is understandable that, however, those skilled in the art can make various changes to the forms and details without departing from the spirit and scope of the present invention.

What is claimed is:

1. A method for controlling network handover of a user equipment, UE, comprising:
    receiving, by a radio network controller, RNC, information of user type of a UE from a serving GPRS support node, SGSN;
    determining, by the RNC, which type of universal integrated circuit card, UICC, the UE is equipped with according to the information of user type of the UE; and
    making a decision, by the RNC, whether to perform a handover of the UE to an evolved universal mobile telecommunication system terrestrial radio access network, eUTRAN, based on the knowledge of which type of UICC the UE is equipped with.

2. The method according to claim 1, wherein the determining comprises:
    if the user type of the UE is a SIM user, then it is determined that the UE is equipped with a UICC of type SIM.

3. The method according to claim 1, wherein the determining comprises:
    if the user type of the UE is a USIM user, then it is determined that the UE is equipped with a UICC of type USIM.

4. The method according to claim 1, wherein the decision is: if the UE is equipped with a UICC of type SIM, then the handover of the UE to the eUTRAN is not performed.

5. The method according to claim 1, wherein the information of user type of the UE is carried in a security mode command sent by the SGSN.

6. A radio network controller, RNC, comprising:
    a memory retains instructions related to
        receiving, by a radio network controller, RNC, information of user type of a user equipment, UE, from a serving GPRS support node, SGSN;
        determining, by the RNC, which type of universal integrated circuit card, UICC, the UE is equipped with according to the information of user type of the UE; and
        making a decision, by the RNC, whether to perform a handover of the UE to an evolved universal mobile telecommunication system terrestrial radio access network, eUTRAN, based on the knowledge of which type of UICC the UE is equipped with; and
    a processor, couple to the memory, configured to execute the instructions retained in the memory.

7. The RNC according to claim 6, wherein the determining comprises:
    if the user type of the UE is a SIM user, then it is determined that the UE is equipped with a UICC of type SIM.

8. The RNC according to claim 6, wherein the determining comprises:
    if the user type of the UE is a USIM user, then it is determined that the UE is equipped with a UICC of type USIM.

9. The RNC according to claim 6, wherein the decision is: if the UE is equipped with a UICC of type SIM, then the handover of the UE to the eUTRAN is not performed.

10. A system, comprising a radio network controller, RNC, and a serving GPRS support node, SGSN, wherein the RNC comprises:
    a memory retains instructions related to
        receiving, by the RNC, information of user type of a user equipment, UE, from the SGSN;
        determining, by the RNC, which type of universal integrated circuit card, UICC, the UE is equipped with according to the information of user type of the UE; and
        making a decision, by the RNC, whether to perform a handover of the UE to an evolved universal mobile telecommunication system terrestrial radio access network, eUTRAN, based on the knowledge of which type of UICC the UE is equipped with; and
    a processor, couple to the memory, configured to execute the instructions retained in the memory.

11. The system according to claim 10, wherein the determining comprises:
    if the user type of the UE is a SIM user, then it is determined that the UE is equipped with a UICC of type SIM.

12. The system according to claim 10, wherein the determining comprises:
    if the user type of the UE is a USIM user, then it is determined that the UE is equipped with a UICC of type USIM.

13. The system according to claim 10, wherein the decision is: if the UE is equipped with a UICC of type SIM, then the handover of the UE to the eUTRAN is not performed.

14. A system, comprising a radio network controller, RNC, and a user equipment, UE, wherein the RNC comprises:
    a memory retains instructions related to
        receiving, by the RNC, information of user type of the UE from a serving GPRS support node, SGSN;
        determining, by the RNC, which type of universal integrated circuit card, UICC, the UE is equipped with according to the information of user type of the UE; and
        making a decision, by the RNC, whether to perform a handover of the UE to an evolved universal mobile telecommunication system terrestrial radio access network, eUTRAN, based on the knowledge of which type of UICC the UE is equipped with; and
    a processor, couple to the memory, configured to execute the instructions retained in the memory.

15. The system according to claim 14, wherein the determining comprises:
    if the user type of the UE is a SIM user, then it is determined that the UE is equipped with a UICC of type SIM.

16. The system according to claim 14, wherein the determining comprises:
    if the user type of the UE is a USIM user, then it is determined that the UE is equipped with a UICC of type USIM.

17. The system according to claim 14, wherein the decision is: if the UE is equipped with a UICC of type SIM, then the handover of the UE to the eUTRAN is not performed.

* * * * *